Figure 1:
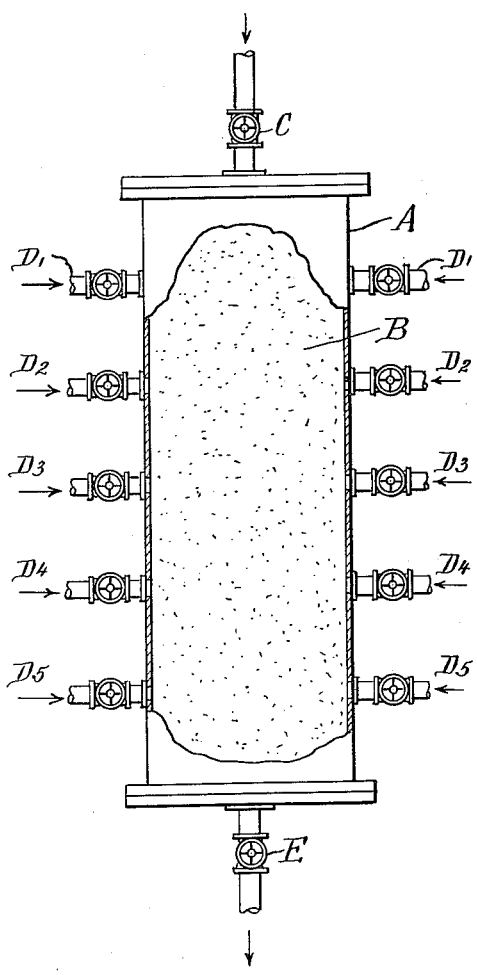

Nov. 19, 1929.  R. WILLIAMS  1,736,065

PROCESS OF PRODUCING HYDROGEN

Filed Aug. 5, 1926

INVENTOR
Roger Williams
BY
Pennie Davis Marvin & Edmonds
ATTORNEYS

Patented Nov. 19, 1929

1,736,065

UNITED STATES PATENT OFFICE

ROGER WILLIAMS, OF WILMINGTON, DELAWARE, ASSIGNOR TO DU PONT AMMONIA CORPORATION, OF WILMINGTON, DELAWARE, A CORPORATION OF DELAWARE

PROCESS OF PRODUCING HYDROGEN

Application filed August 5, 1926. Serial No. 127,443.

This invention relates to a method of producing hydrogen from gaseous mixtures of steam and hydrocarbons with the aid of a catalyst, and particularly to the heating of the catalyst for the purpose of maintaining the reaction.

A process for the conversion of a mixture of steam and hydrocarbons such as methane into hydrogen by a catalytic reaction is described in United States Patent No. 1,128,804. It depends upon the maintenance of the catalyst at a relatively high temperature, 700° C. This process may be utilized provided the necessary temperature can be maintained and if the presence of carbon monoxide in the product does not render it unsuitable for its intended use.

In the copending Williams application Serial No. 118,600 an improved process for the catalytic production of hydrogen is described. This process can be operated at temperatures materially below 700° C. and it is especially effective because the primary reaction proceeds as follows:

$$CH_4 + 2H_2O = CO_2 + 4H_2$$

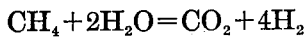

This reaction results in the production of the minimum quantity of carbon monoxide in the gaseous mixture and the hydrogen is consequently better adapted for utilization for the hydrogenation of fats and the production of synthetic ammonia, for example.

Catalytic reactions between hydrocarbons and steam are strongly endothermic. The reaction above described results, for example, in a loss of 39.3 Cal. and it is necessary to supply a corresponding amount of heat in order that the reaction may continue. An economical method of supplying the heat consists in introducing a sufficient amount of oxygen to the steam-hydrocarbon mixture to permit a portion of the gas to burn. I have found, however, that merely to introduce oxygen with the steam and hydrocarbon before it reaches the catalyst is not a satisfactory procedure. If the quantity of oxygen introduced is sufficient to burn enough of the hydrocarbon to make up the heat loss in the reaction, the initial rise in temperature of the gases resulting from the combustion is so great that either one or both of two undesirable conditions may arise, that is, the catalyst may be overheated to such an extent that a change in physical form causes a decrease in activity, or the high temperature may cause the reaction to proceed as follows:

$$CH_4 + H_2O = 3H_2 + CO,$$

thus introducing an undesirable quantity of carbon monoxide in the gaseous product.

It is the object of the present invention to provide a method of conducting catalytic production of hydrogen from hydrocarbons and steam, and particularly to provide for the maintenance of the necessary temperature of the reaction by combustion of a portion of the gaseous mixture while avoiding excessive temperatures in any portion of the catalyst.

Other objects and advantages of the invention will be understood by reference to the following specification and to the accompanying drawing; in which—

Figure 2:
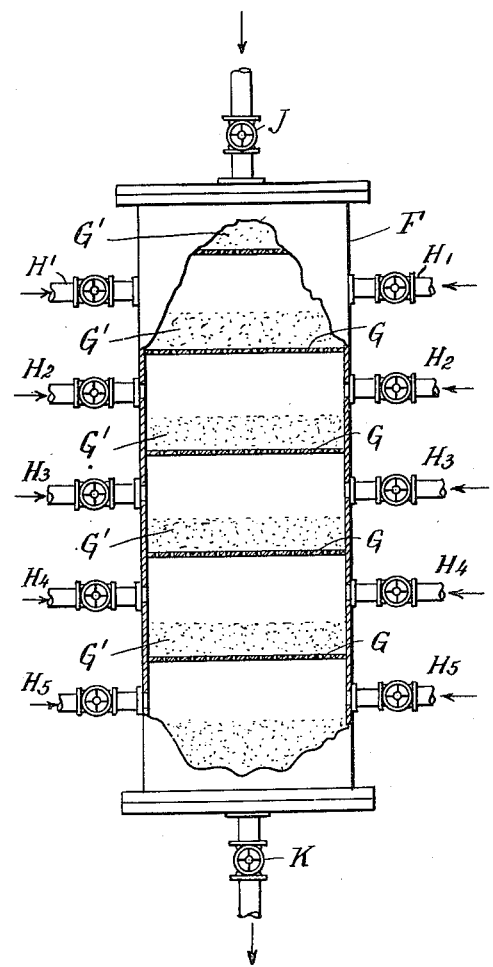

Fig. 1 is an elevation, partially in section, of a catalyst chamber adapted for the practice of the invention; and Fig. 2 is a similar view showing another form of the catalyst chamber.

I have discovered that the disadvantages arising from the use of oxygen to support combustion of a portion of the gaseous mixture in contact with the catalyst in the catalytic production of hydrogen from a mixture of hydrocarbon and steam can be avoided if the oxygen is added to the reacting gases in separate stages as the gaseous mixture passes over or through the catalyst. The amount of combustion and consequently the quantity of heat liberated at any particular stage in the catalyst is thus limited and the amount of oxygen added at any particular stage can be regulated so as to release the quantity of heat required to maintain the necessary temperature in that particular stage. The heat loss due to the endothermic nature of the reaction and to radiation of heat from the catalyst chamber can be thus more or less exactly compensated so that the reaction can proceed at a substantially uniform temperature throughout the catalyst body.

While the procedure as described is applicable in conjunction with the usual arrangement of the catalyst as a continuous mass, I have found that it is particularly useful if applied to a catalyst body which is divided into a number of independently supported portions as, for example, by providing a plurality of spaced trays for the catalyst. The trays may be sufficiently spaced to provide a gas chamber between each succeeding tray and the oxygen can be introduced to these chambers in such a way that the major portion of the combustion takes place principally out of direct contact with the catalyst. As a consequence the possibility of overheating the catalyst is avoided.

In the practical application of the invention a catalyst chamber of any suitable form may be employed. It may, for example, be generally cylindrical in shape with an inlet for the gaseous mixture and an outlet for the gaseous product at opposite ends. The chamber may be filled with the catalyst and a number of inlet pipes may be provided for the oxygen or oxygen-containing gas, suitable regulating valves being mounted on the inlet pipes to permit regulation of the quantity of the oxygen or oxygen-containing gas which is supplied at any particular stage of the catalyst. Alternatively, as hereinbefore indicated, the catalyst chamber may be divided by partitions or trays upon which the catalyst body is supported, the trays being perforated to permit the passage of the gaseous mixture through the catalyst chamber. A plurality of suitable pipes controlled by valves can be provided to permit the introduction of the desired quantities of oxygen or oxygen-containing gas. Other types of apparatus may be employed but the following will serve to illustrate the preferred forms of apparatus.

Referring to Fig. 1 of the drawing, A indicates a cylindrical catalyst chamber which may be filled with the catalyst B. The gaseous mixture of steam and hydrocarbon is introduced through a pipe C at one end of the catalyst chamber and the gaseous products escape through a pipe E. A plurality of pipes $D_1$, $D_2$, $D_3$, $D_4$ and $D_5$, each having a suitable regulating valve, are arranged on opposite sides of the catalyst chamber to permit the introduction and distribution of oxygen or oxygen-containing gas to the catalyst in the manner and for the purpose hereinbefore described. It is apparent that by manipulation of the valves in the oxygen inlet pipes, the oxygen can be distributed so as to permit the combustion of any desired amount of the hydrocarbon in the successive stages of the catalyst body.

In Fig. 2 the cylindrical catalyst chamber F contains a number of perforated trays G upon which successive portions G' of the catalyst rest. The gaseous mixture of steam and hydrocarbon is introduced through a pipe J and the gaseous product escapes through a pipe K. A plurality of pipes $H_1$, $H_2$, $H_3$, $H_4$ and $H_5$, are arranged on opposite sides of the catalyst chamber with suitable valves so as to permit the introduction of oxygen or oxygen-containing gas to the spaces above the bodies of catalyst G'. As the gaseous mixture enters the catalyst chamber it contacts with the uppermost body of the catalyst and then enters the spaces below the uppermost tray. At this point the desired amount of oxygen or oxygen-containing gas is introduced through the pipe $H_1$ to permit the combustion of the desired proportion of the hydrocarbon to produce the heat required to maintain the temperature of the gaseous mixture. The gaseous mixture thus heated proceeds through the succeeding portions of the catalyst with the intermittent addition of oxygen or oxygen-containing gas in the proportions required to meet the condition of the maintenance of a substantially uniform temperature throughout the catalyst chamber.

Any suitable catalyst may be employed in conducting the reaction, but I prefer to employ a catalyst such as that described in the Williams application above mentioned and consisting of nickel with a promoter. Among the substances which are suitable as promoters are cerium oxide, yttrium oxide, thorium oxide, xirconium oxide, molybdenum oxide, vanadium oxide, tungsten oxide, uranium oxide, titanium oxide, glucinum oxide, chromium oxide, aluminum oxide, manganese oxide, silicon oxide, tantalum oxide, boron oxide, zinc oxide, cadmium oxide, potassium oxide and calcium oxide. While the addition of promoters to nickel catalysts is especially advantageous since it permits the production of hydrogen from hydrocarbons and steam at temperatures even below 600° C., the usefulness of such promoted nickel catalysts is not limited to these temperatures. Moreover, the invention does not depend upon these particular catalysts and the operation can be conducted, therefore, at higher temperatures and with the catalyst as described, for example, in United States Patent No. 1,128,804.

As an example of the invention, a suitable catalyst can be prepared as follows: Crush pumice stone and screen to 8–14 mesh. Wash with boiling hydrochloric acid until free from iron and then with boiling distilled water until free from chlorides. After drying at 200° C. stir 100 parts at that temperature into a boiling solution of 50 parts of nickel nitrate and 2.6 parts of cerium nitrate, all of which should be free from sulphur, halogens and other contact poisons, in 70 parts of distilled water. After absorption is complete remove the pumice from the solution and calcine it at 400° C. until the nitrogen oxides have been expelled. Place the product in the catalyst chamber and heat for one hour in a stream of pure hydrogen at 400° C.

The catalyst thus prepared can be disposed in the catalyst chamber as hereinbefore described either as a continuous body or upon the trays as illustrated in Fig. 2. The gaseous mixture, which may consist, for example, of steam and methane freed from sulphur compounds and other catalyst poisons, is prepared in the proportion of 15 volumes of methane to 150 volumes of steam. This mixture is introduced at the inlet to the catalyst chamber after being heated, for example, in a heat exchanger through which the heated products of the reaction are delivered from the catalyst chamber. The temperature of the gaseous mixture passing into contact with the catalyst should be approximately 550° C. In passing through the first stage of the catalyst the absorption of heat by the endothermic reaction will cause a drop in temperature to approximately 500° C. A sufficient amount of oxygen or oxygen-containing gas such, for example, as air, is admitted then through the valve $D_1$ or $H_1$ to cause a rise in temperature by the combustion of a portion of the hydrocarbon. The temperature may be raised thus to approximately 550° C. and it will fall gradually during the passage of the gas through the catalyst of the next stage until it is again about 500° C. The introduction of air, for example, in the successive stages is continued with suitable regulation by means of the valves to permit the desired compensation for heat loss in the reaction. The gaseous product passes finally from the catalyst chamber through the outlet and into the exchanger where it serves to initially heat the entering gaseous mixture.

It is to be understood that a portion of the oxygen-containing gas such as air may be introduced to the gaseous mixture before it contacts with the catalyst. I have found it to be advantageous, however, to add the oxygen only after the steam-hydrocarbon mixture has passed through the initial stage of the catalyst and has reacted to form hydrogen. This procedure has an important advantage. It has been observed that under some circumstances the catalyst will suffer a sudden and complete loss of activity possibly due to oxidation if air is admitted with the steam-hydrocarbon mixture unless there is also present in the mixture a reducing gas such as hydrogen or carbon monoxide. By delaying the introduction of oxygen until the gaseous mixture has undergone a partial reaction to produce hydrogen, this possibility of loss of activity of the catalyst is eliminated. While I do not wish to be limited to any explanation of this phenomenon, it appears probable that the hydrogen or carbon monoxide formed by the partial reaction of the steam-hydrocarbon mixture combines more readily with oxygen than does the hydrocarbon so that when the introduction of air is delayed there is less opportunity for the oxygen to react with the catalyst.

Various changes may be made in the details of operation as well as in the construction of the apparatus without departing from the invention or sacrificing any of the advantages thereof.

I claim:—

1. The process of manufacturing hydrogen, which comprises passing a mixture of steam and a gaseous hydrocarbon over a portion of a heated catalyst to effect a partial reaction, adding oxygen to the mixture and passing it over a further portion of the catalyst.

2. The process of manufacturing hydrogen, which comprises passing a mixture of steam and a gaseous hydrocarbon over a heated catalyst and adding oxygen to the mixture while the reaction is proceeding.

3. The process of manufacturing hydrogen by the reaction of steam and a gaseous hydrocarbon in the presence of a heated catalyst, wherein oxygen is added to the gases only after the mixture has undergone partial reaction in contact with the catalyst.

4. The process of manufacturing hydrogen, which comprises passing a mixture of steam and methane over a portion of a heated catalyst to effect a partial reaction, adding oxygen to the mixture and passing it over a further portion of the catalyst.

5. The process of manufacturing hydrogen, which comprises passing a mixture of steam and methane over a heated catalyst and adding oxygen to the mixture while the reaction is proceeding.

6. The process of manufacturing hydrogen by the reaction of steam and methane in the presence of a heated catalyst, wherein oxygen is added to the gases only after the mixture has undergone partial reaction in contact with the catalyst.

7. The process of manufacturing hydrogen, which comprises passing a mixture of steam and a gaseous hydrocarbon over a heated catalyst and adding successive portions of oxygen to the gaseous mixture in the proportion required to maintain the temperature necessary for the reaction by combustion of some of the hydrocarbon.

8. The process of manufacturing hydrogen, which comprises passing a mixture of steam and methane over a heated catalyst and adding successive portions of oxygen to the gaseous mixture in the proportion required to maintain the temperature necessary for the reaction by combustion of some of the hydrocarbon.

9. The process of manufacturing hydrogen, which comprises passing a mixture of steam and a gaseous hydrocarbon over a succession of spaced catalyst bodies and introducing oxygen to the gaseous mixture during its passage through the space between the catalyst bodies in the proportion required to maintain the temperature necessary for the reaction by combustion of some of the hydrocarbon.

10. The process of manufacturing hydrogen, which comprises passing a mixture of steam and methane over a succession of spaced catalyst bodies and introducing oxygen to the gaseous mixture during its passage through the space between the catalyst bodies in the proportion required to maintain the temperature necessary for the reaction by combustion of some of the hydrocarbon.

In testimony whereof I affix my signature.

ROGER WILLIAMS.